US010094903B2

(12) United States Patent
Lowry et al.

(10) Patent No.: US 10,094,903 B2
(45) **Date of Patent: *Oct. 9, 2018**

(54) OBJECT TRACKING AND DATA AGGREGATION IN PANORAMIC VIDEO

(71) Applicant: C360 Technologies, Inc., Wexford, PA (US)

(72) Inventors: Brian C. Lowry, Emlenton, PA (US); Evan A. Wimer, Pittsburgh, PA (US); Joseph B. Tomko, Wexford, PA (US)

(73) Assignee: C360 Technologies, Inc., Wexford, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/051,312

(22) Filed: Feb. 23, 2016

(65) Prior Publication Data

US 2016/0173775 A1 Jun. 16, 2016

Related U.S. Application Data

(63) Continuation of application No. 13/767,489, filed on Feb. 14, 2013, now Pat. No. 9,588,215.

(60) Provisional application No. 61/598,734, filed on Feb. 14, 2012.

(51) Int. Cl.

| | |
|---|---|
| ***H04N 7/00*** | (2011.01) |
| ***G01S 3/786*** | (2006.01) |
| ***H04N 5/232*** | (2006.01) |
| ***G01S 1/04*** | (2006.01) |
| *A63B 71/06* | (2006.01) |
| *H04N 5/262* | (2006.01) |

(52) U.S. Cl.
CPC ............ *G01S 3/7865* (2013.01); *G01S 1/047* (2013.01); *H04N 5/23238* (2013.01); *A63B 71/0605* (2013.01); *A63B 2220/806* (2013.01); *H04N 5/2628* (2013.01)

(58) Field of Classification Search
CPC ... G01S 3/7865; G01S 1/047; H04N 5/23238; H04N 5/2628; A63B 71/0605; A63B 2220/806
USPC .......................................................... 348/36
See application file for complete search history.

(56) References Cited

U.S. PATENT DOCUMENTS

2004/0032495 A1* 2/2004 Ortiz ..................... H04N 5/232 348/157

* cited by examiner

*Primary Examiner* — Michael Lee
*Assistant Examiner* — Omer Khalid
(74) *Attorney, Agent, or Firm* — Ference & Associates LLC

(57) ABSTRACT

Methods and systems for real-time object tracking and data aggregation in panoramic video are disclosed. An example system provides a panoramic video camera that produces panoramic video data of an area; a plurality of radio frequency tags producing tracking data; and at least one of the radio frequency tags being co-located with the panoramic video camera, producing tracking data for the panoramic video camera; at least another of the radio frequency tags being co-located with at least one object within the area, producing tracking data for the at least one object; a computing device, wherein the computing device receives the panoramic video data and further receives the tracking data from the plurality of radio frequency tags; the computing device generating a video stream by augmenting the panoramic video data with the tracking data; the computing device sending the video stream to at least one remote system. Other methods and systems are disclosed.

17 Claims, 4 Drawing Sheets

13 6 14 5 4 9 1 2 10 11 3 8 7 12

OBJECT TRACKING AND DATA AGGREGATION IN PANORAMIC VIDEO

CROSS REFERENCE TO RELATED APPLICATIONS

This application is a continuation application of U.S. patent application Ser. No. 13/767,489, filed on Feb. 14, 2013, and entitled "OBJECT TRACKING AND DATA AGGREGATION IN PANORAMIC VIDEO," which claims priority to U.S. Provisional Patent Application Ser. No. 61/598,734 entitled "REAL-TIME OBJECT TRACKING AND DATA AGGREGATION IN PANORAMIC VIDEO", filed on Feb. 14, 2012, the contents of each one are incorporated by reference herein.

BACKGROUND

Streaming, digital video cameras are ubiquitous, serving many applications, primarily in security and surveillance. For these installations, the camera is typically permanently mounted, and has either a wide field of view, or pan, tilt, and zoom (PTZ) capabilities for control by a remote operator. While the operator is controlling a camera to follow an object of interest, the camera view is diverted from other areas causing "blind spots". Such cameras are useful only for a single operator. Another type of camera is a panoramic camera having a 360° horizontal field of view. When a panoramic camera is used, objects of interest are easily lost with such a large horizontal field of view.

BRIEF SUMMARY

In summary, one aspect provides a system, comprising: a panoramic video camera that produces panoramic video data of an area; a plurality of radio frequency tags producing tracking data; and at least one of the radio frequency tags being co-located with the panoramic video camera, producing tracking data for the panoramic video camera; at least another of the radio frequency tags being co-located with at least one object within the area, producing tracking data for the at least one object; a computing device, wherein the computing device receives the panoramic video data and further receives the tracking data from the plurality of radio frequency tags; the computing device generating a video stream by augmenting the panoramic video data with the tracking data; the computing device sending the video stream to at least one remote system.

Another aspect provides a device, comprising: a remote computing device, comprising: a processor; and a memory device that stores instructions executable by the processor to: receive panoramic video data of an area produced by a panoramic video camera; receive tracking data produced by a plurality of radio frequency tags co-located with objects within the area; generate a video stream by augmenting the panoramic video data with the tracking data; stream a displayable portion of the video stream to at least one remote system; receive, from the at least one remote system, selection information; and adjust the displayable portion of the video stream to the remote system based upon the selection information.

A further aspect provides a system, comprising: more than one panoramic video camera, each producing panoramic video data of an area; a plurality of radio frequency tags producing tracking data; and at least one of the radio frequency tags being co-located with each of the more than one panoramic video camera, producing tracking data for each of more than one the panoramic video camera; at least another of the radio frequency tags being co-located with at least one object within the area, producing tracking data for the at least one object; a computing device, wherein the computing device receives the panoramic video data from each of the more than one panoramic video camera and further receives the tracking data from the plurality of radio frequency tags; the computing device generating a video stream by augmenting the panoramic video data received from at least one of the more than one panoramic video camera with the tracking data; the computing device sending the video stream to at least one remote system.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
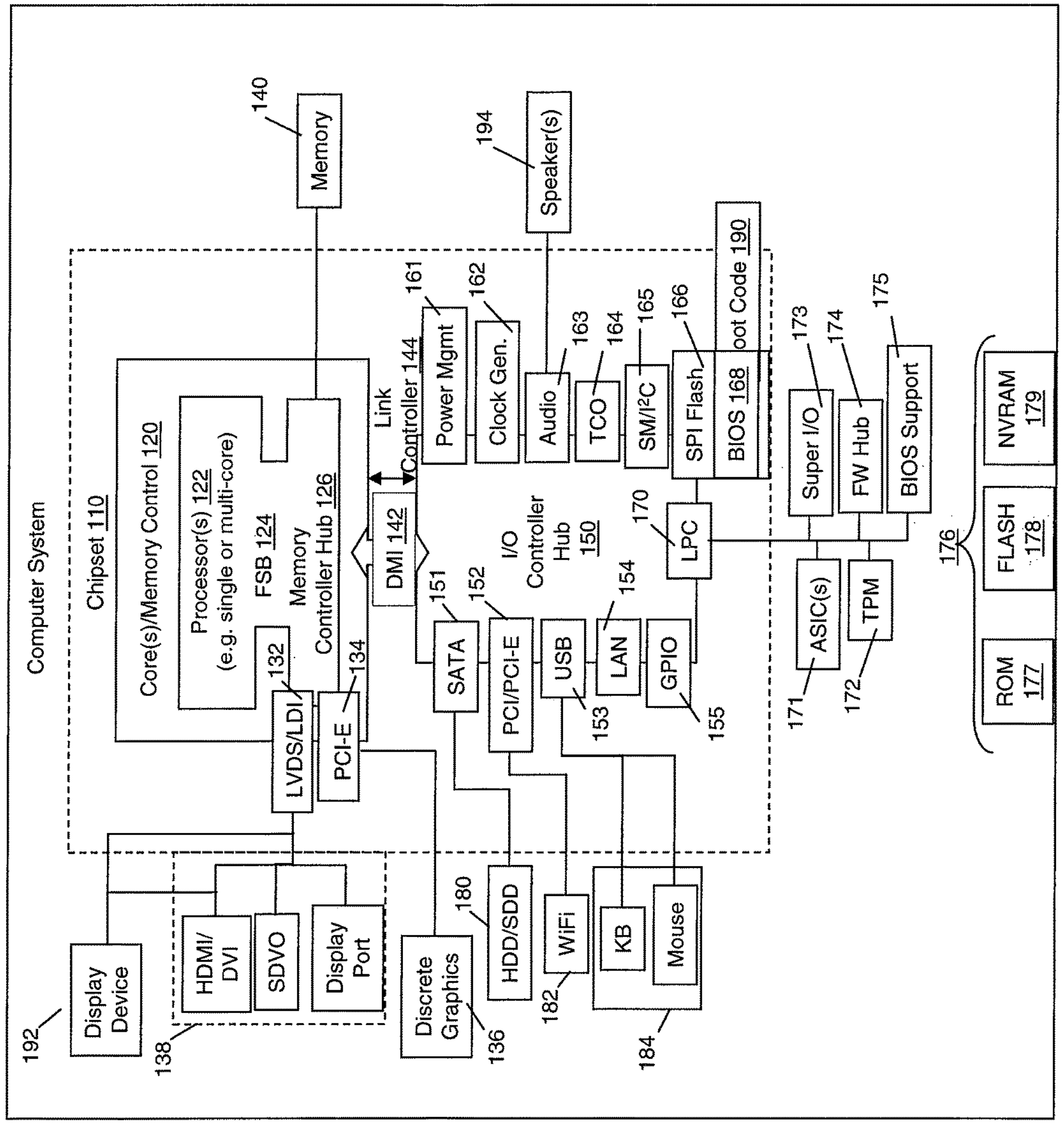
FIG. 1 illustrates an example information handling device and components thereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The inventors have recognized a need for a camera that provides panoramic views, such that no "blind spots" exist, yet allows for multiple operators to simultaneously view portions of the panoramic video stream. Moreover, the inventors have also recognized that a need exists for tracking or tagging objects of interest and providing a method for manually or automatically changing the view for the purpose of following these objects in the panoramic video. Accordingly, at least one embodiment provides a system and method for merging the benefits of the technologies of panoramic video camera and real time location services (RTLS) such that the data stream produced by persons or objects that are being tracked in real-time, via panoramic video camera and RTLS, can be viewed simultaneously by many users, along with metadata, such as asset information, from any information handling device capable of receiving the digital stream, such as a remote computer, "smart" phone, tablet computing device, or internet TV set, or the like. Moreover, this data stream can be further aggregated with other telemetry data to provide real-time Supervisory Control and Data Acquisition (SCADA) and situational awareness.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 depicts a block diagram of one example of information handling device circuits, circuitry or components. The example depicted in FIG. 1 may correspond to computing systems sold by Lenovo Group Ltd., Hewlett-Packard Co., Dell Inc., and others, or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
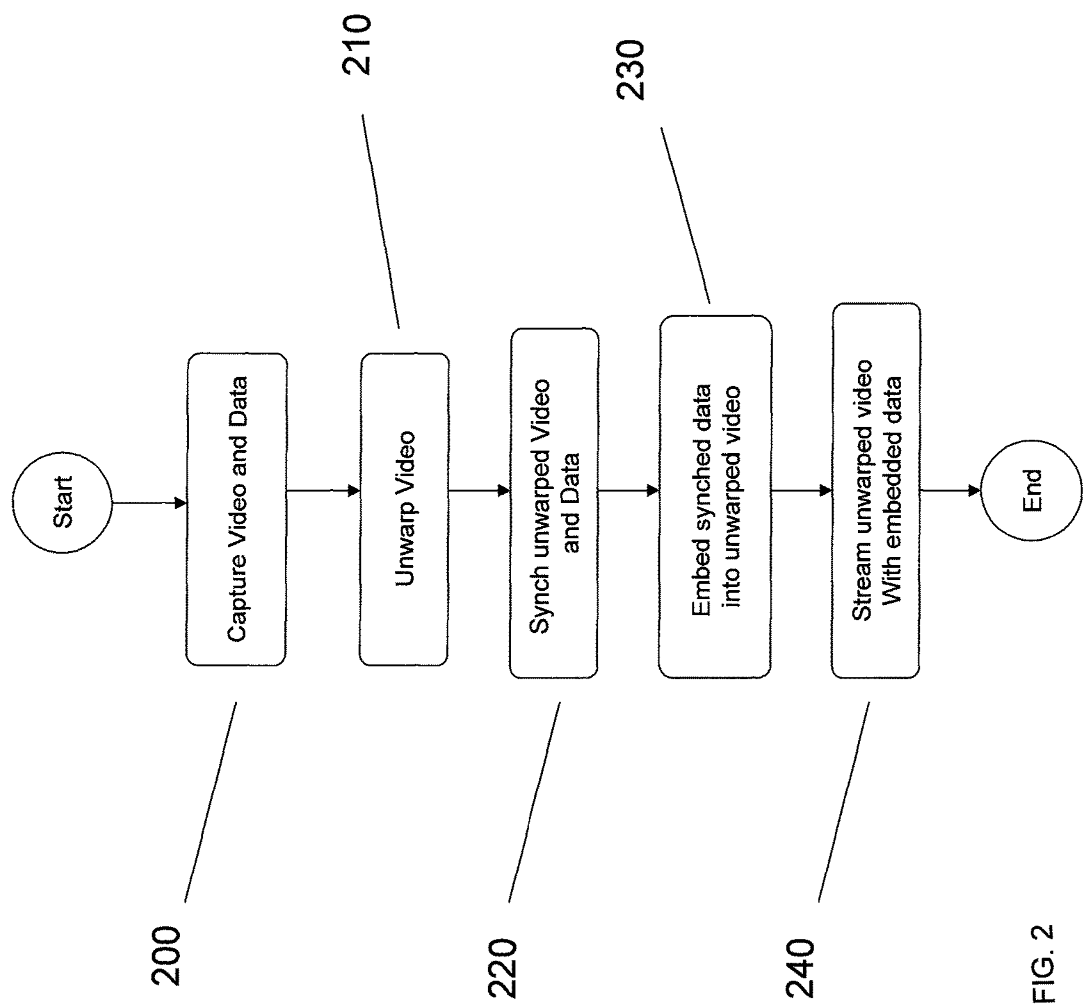
FIG. 2 illustrates an example method.

FIG. 2 depicts a flow chart in accordance with an embodiment. At 200, video and data is captured. It is presently preferred that video is captured with a Cinema EOS C500 4K Digital Cinema Camera available from Canon U.S.A., Inc., Lake Success, N.Y., although any appropriate camera may be used. Use of a 4K camera permits post-capture processing which may degrade resolution of the image, but still permits the post processed image to have resolution of at least 1080p, which is the currently higher form of High Definition video. It also presently preferred that the C500 camera be equipped with a custom panomorph lens from ImmerVision, Montreal, Canada, which permits a 360° view in one plane and a 180° view in another plane, although any suitable lens may be used. It is further preferred that the optics of the lens be such that the optics are appropriate for the venue in which the camera and lens are placed. For example, for a basketball game where the camera and lens are suspended from the scoreboard above the court, it may be that the sharpest focus for the image should be at the basketball hoops at either end of the court.

It is also presently preferred that data be captured. This data may include position information about assets, such as players or objects within the video image being collected by the video camera. Additional information may also be collected, i.e., telemetry information about the asset, such as heart rate, body temperature, etc., for a sports player. In outdoor settings, it may be appropriate to use a position collection system based upon the Global Positioning System (GPS) satellites. An example of such a GPS based system is shown at www.sportvision.com/media/sailing-reel.

As a GPS based system relies upon the availability of line of sight access to various satellites, it is not appropriate for use in an indoor setting or other settings where there may be obstructions. Furthermore, a GPS system operates at a low frequency (<0.2 Hz) and may not be appropriate for a setting where a high degree of positional accuracy is desired. Accuracy of GPS systems is ~3 m. Other technologies exist for higher frequency and indoor applications, offering improved real-time and spatial accuracy. These systems are generally described by the acronym "RTLS"—Real Time Location Services, and are commonly used in industrial, supply-chain, and healthcare applications for asset and personnel tracking. These radio-frequency (RF) based solutions include Wi-Fi (IEEE 802.11 a/b/g/n), Zigbee (IEEE 802.15.4), and UWB (Ultra Wide Band). As described in ISO/IEC 24730-2:2006, these solutions utilize a networked location system that provides X-Y coordinates and data telemetry. RTLS transmitters autonomously generate a direct-sequence spread spectrum radio frequency beacon, providing accuracy from 1-3 m in the case of Wi-Fi, down to several cm for UWB.

One such system which may be used in an embodiment is available from Purelink Technologies, Inc., Montreal, Canada. In an embodiment, for example, a basketball game, the players, referees, coaches, etc., would wear Radio Frequency Identification (RFID) tags and four RFID transceivers would be set up; one at each corner of the court. Using, inter alia, the time delay of the signal received at each transceiver, the Purelink Technologies' system will provide information on the position (X, Y, and Z) of each asset.

At 210, the video captured by the panoramic camera is "unwarped". It will be appreciated that the unwarping process occurs because the panoramic lens is non-planar. This unwarping requires considerable computing power since mega-pixel video frames must be processed at rates up to thirty frames per second. Unwarping is typically accomplished utilizing software provided by the manufacturer of the panoramic lens given that the best results are obtained when the unwarping process is specific to the optics of a given panoramic lens. Such post-capture processing, however, degrades the resolution of the video image, thus the video image may no longer be a 4K image. It is desired, however, that the unwarped image be at least 1080p.

At 220, the unwarped video and the collected data are synchronized. Synchronization is generally performed by matching up time stamps on the appropriate bits of video and data in terms of time synchronization. Moreover, coordinate data from a location service, as described herein, may be synchronized or mapped to the video data, e.g., by selecting a known location common to the video data and coordinate data. For example, the common point for a basket ball game may be center court or a boundary line. Any appropriate method of synchronization may be used.

At 230 the synched data is embedded into or mixed with the unwarped video. This may be accomplished in any appropriate manner. In one embodiment, the aggregate data streams utilize the MPEG-4 Part 14 multimedia container. In another embodiment, the MPEG-7 format is used.

At 240 the synched unwarped video and data are streamed. Streaming may be accomplished in any appropriate manner, including directly from the site or feeding the synched unwarped video and data to a server (either local or remote), which in turn streams the information to the ultimate viewer.

Figure 3:
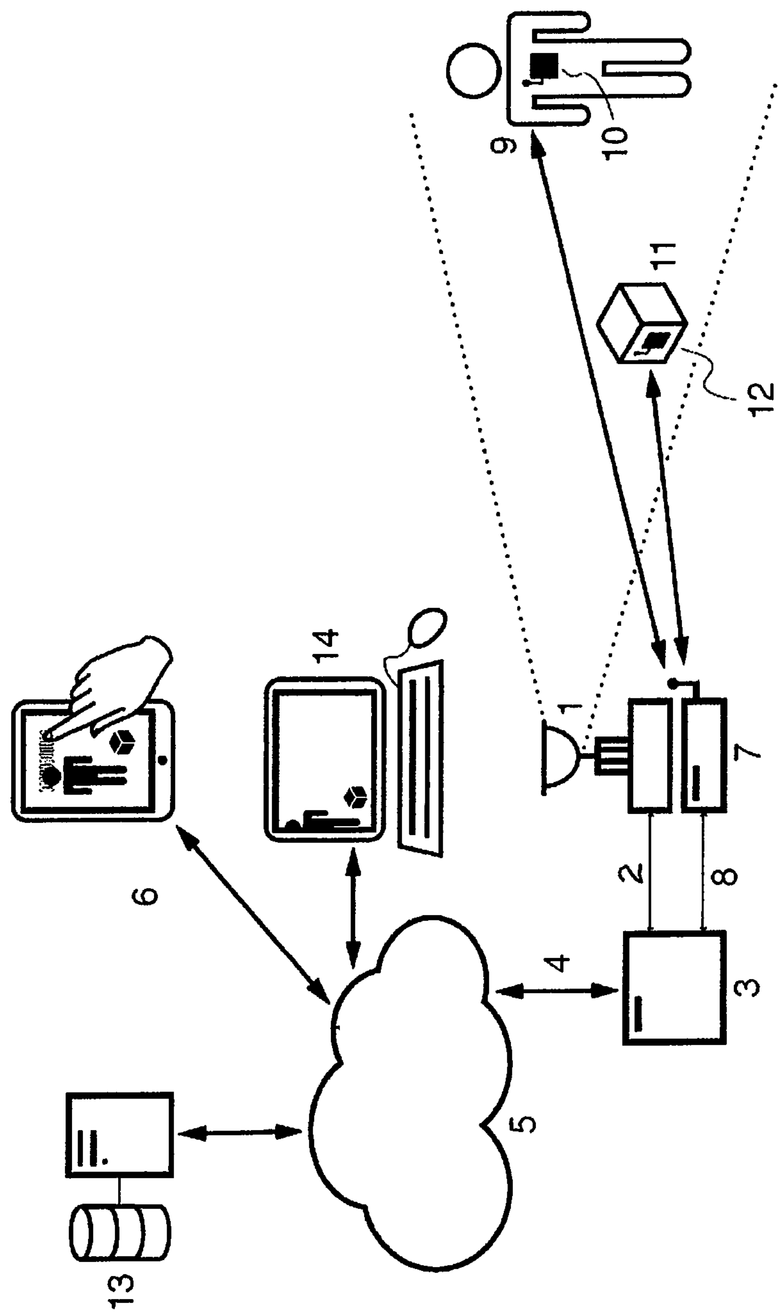
FIG. 3 illustrates an example embodiment.

Turning now to FIG. 3, this figure depicts a panoramic video camera (1) that can be either mounted permanently or mounted to a mobile base. Video is streamed via a high speed digital serial interface (2) to an information handling device (3). Audio may be streamed as well if it is desired. An information handling device (3) unwarps the video stream and then transmits the information, via a network connection (4), to the internet (5). Telemetry data that is associated with the video data may be aggregated with the video stream or transmitted via a separate stream. A singular or plurality of active Radio Frequency (RF) transceivers (10) and (12), commonly known as "tags", cooperate with RF transceivers (7) to provide blanket coverage of a pre-determined area. At (8), the RF transceivers and the computing device (3) are operably connected. The RF tags may be worn, or permanently affixed to assets. A unique RF tag is also assigned to the panoramic camera. As assets move within the area covered by the wireless transceiver network, their positions relative to the camera are captured in real-time. These positions, mapped as Euclidean coordinates in three dimensions (X, Y, Z) are transmitted with the video stream to "cloud-based" servers (13). Multiple remote systems (6) and (14) accessing this aggregated stream can simultaneously view the panoramic video, telemetry, and real-time locations relative to the camera.

One embodiment uses a fixed focal length compensated equiangular lens, although other commercial off the shelf technologies exist, such as omni-directional catadioptric lenses. The lens is designed such that each pixel subtends an equal solid angle, or an equal area on the unit sphere resulting in superior image quality as will be understood by those acquainted in the art. As used herein, the term "panoramic" refers to a 360° horizontal field of view. In some situations, such a 360° field of view is not necessary. It will be appreciated that the field of view can be reduced as required.

The lens is coupled with a digital video camera as shown (1). The digital video camera and lens apparatus are ideally situated such that the camera is at right angles with the horizon. An adjustable or self-leveling mount can be used to orient the apparatus appropriately. A microphone may be integrated into the apparatus as well. The digital video camera output is connected to an information handling device (3) via high speed digital serial interface (2), such as USB or IEEE 1394 commonly known as Apple's FIREWIRE®. The information handling device may be a commercially available information handling device or a custom-built application specific device. The information handling device (3) has several functions. Firstly, the information handling device (3) must unwarp the digital video stream from the camera. This unwarping requires considerable computing power since mega-pixel video frames must be processed at rates up to thirty frames per second. Secondly, it must "stream" the digital video information from the camera. One embodiment utilizes the H.264/MPEG-4 Part 10 streaming codec which provides excellent video quality at low bit rates, as well as stereo audio. Thirdly, the information handling device (3) processes RTLS data from the wireless receivers (7). The quantity and positioning of the wireless receivers (7) impacts obtaining accurate RTLS over a geographic area.

FIG. 3 depicts a person (10) wearing a RF transceiver (9). The person may move around freely and will be spatially tracked as long as he remains in proximity to wireless receivers (7) (multiple wireless receivers are not shown). In the event that the person or object moves outside of the geographic area covered by the wireless receivers (7), a fallback technology such as GPS may be employed to provide tracking. Likewise, the person will appear in the video stream as long as he remains in sight of the camera lens. FIG. 3 also shows a fixed asset (11) also equipped with a RF tag (12). In the preferred embodiment, the RF tags (10) and (12) are unique in the sense that they communicate data relevant to each asset. A database is preferably maintained which stores information unique to each asset. This database may be located on remote database server (13) or elsewhere, including locally. For example, fixed asset (11) may be a piece of equipment. For this asset one may want to store parameters such as type, serial number, installation date, etc. For personnel (9), one may want to store parameters such as name, date of birth, hire date, job function, etc. When viewing the information remotely via information handling device (6) (tablet) or information handling device (14) (computer), this metadata can be retrieved by selecting or "clicking" on the asset, or an indicator ascribed to the asset, as viewed on the screen. This metadata can then be formatted appropriately for the remote user's screen, for example, in the form of a "popup" dialog or some other form advantageous to the display of information overlaid upon video.

Information handling device (3) communicates data with the internet (5) via a data link (4) that may be wireless (Wi-Fi), cellular (3G/4G/GPRS), or a "hardwired" connection such as DSL or fiber optic. The communication link (4) must have sufficient bandwidth to sustain the video and aggregate data streams. In one embodiment, the aggregate data streams utilize the MPEG-4 Part 14 multimedia container. In a second embodiment, the MPEG-7 format is used.

Once the synched unwarped video and data is streamed, it is available for viewing by a plurality of users. Viewing may be accomplished using any suitable software application, such as Apple's QuickTime® player, Microsoft® Windows® Media Player, and various online players as are utilized by YouTube®, Vimeo®, and the like. It is presently preferred, however, to use the JW Player from Longtail Video, New York, N.Y., which permits a custom shell.

Because the digital video camera (1) produces a fixed panoramic image, remote systems can elect to interact with different views of the panorama. Remote information handling devices (6) and (14) contain custom built application software that is capable of decoding video streams as well as aggregate metadata. On tablet system (6), both assets (9) and (11) are visible in the center of the screen. The user may use controls built into the software to "move" the section of the panorama being viewed as well as to "zoom" in and out. Remote computer (14) shows the view into the panorama being shifted to the right so that assets (9) and (11) appear shifted to the left. In this manner, any number of remote systems can interact with unique views into the panorama. In one embodiment, the remote horizontal field of view is 140° or less. Alternatively, to manually navigate through the view, the software can be set to automatically track the asset. As the asset moves relative to the camera, the remote view moves accordingly so as to keep the asset centered in the remote view.

Figure 4:
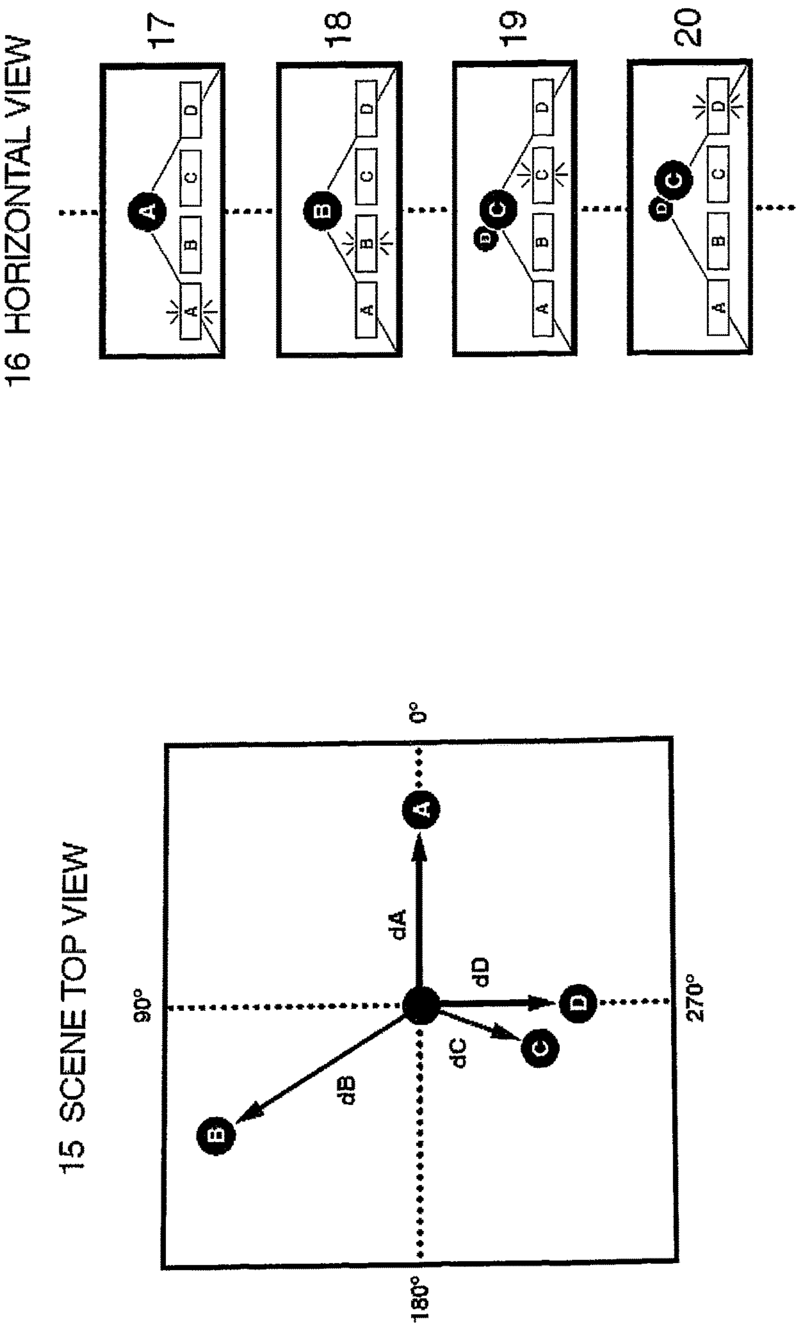
FIG. 4 illustrates an example embodiment.

In accordance with embodiments, panorama views are associated with assets such that the software on the remote systems can instantaneously change the view to track an asset. Referring now to FIG. 4, a top view (15) is shown where the camera and associated apparatus is located in the center of a two-dimensional area. This area corresponds to the area both "seen" by the camera and blanketed by receiver coverage necessary for tracking motion. For the sake of clarity, it is assumed that assets A, B, C, and D are at ground level (inclination 0°). Asset A is located, in radial coordinates, at (dA, 0°). Measuring angles counterclockwise, assets B, C, D are located at (dB, 120°), (dC, 260°), and (dD, 270°), respectively.

FIG. 4 (16) shows a horizontal view that would be viewed utilizing an appropriate player and are typical of what a user at a remote information handling device (6) and (14) would see on his screen when accessing the video stream. In (16), the player is also displaying software "buttons" which correspond to the assets in the panoramic view which are capable of being tracked. A viewer would select which asset (i.e., player) the viewer would like to follow or track. In (17), asset A is "tracked" by centering asset A in a 140° section of the panorama. In (18), asset B is "tracked" in a similar manner. If either asset A or asset B are non-stationary and move within one half of the remote field of view, i.e., 70°, of each other relative to the camera base, then each would appear in the other asset's view. This is elucidated in (19) and (20) where assets C and D are shown in the same view because of their angular proximity. In short, centering of the tracked asset within the software player involves displaying only a portion of the entire panoramic image. Software controls exist for changing one's view. For example, moving the right arrow on the keyboard will cause the view to pan to the right. This can also be accomplished with mouse movements, as well as gestures on a tablet device. The portion of the panoramic image being displayed may be defined by default preferences, either system or user, and may also be readily changeable by the user (i.e., viewer).

Additional example embodiments are now described.

In a further embodiment, a plurality of panoramic cameras at a single location may be employed. In accordance with this disclosure, the remote view will show the panorama from the camera that is closest to the asset. As the asset moves, the distance to each camera is calculated with the remote view switching accordingly.

In another embodiment, a plurality of panoramic cameras are located in a plurality of locations. The remote viewing software will then offer the same level of interactivity as described in previous embodiments, namely, to automatically track an asset in a remote view, or to allow for remote control of the view in order to track a plurality of assets in a single or multiple views.

In another embodiment, the remote view software that associates metadata with assets is programmed to perform tasks and to form complex associations with data, giving it the ability to make autonomous operational decisions. In one non-limiting example, a fixed asset such as a piece of industrial equipment might be approached by a tagged person. If that person is not authorized to operate that equipment, an alert is sent via SMS to that person's supervisor alerting them to the situation. This alert event is then logged at the data repository. As a second non-limiting example, using the hockey example from above, if two players begin fighting, as determined by being in close proximity for several seconds, then metadata showing past statistics regarding how many past fights each player has been in as well as other relevant information would be shown. Complex associations may be formed by searching through other data repositories, such as databasehockey.com, using a real-time application programming interface (API). Forming new data based upon ephemeral tag locations provides an interactive spectator experience that is unique to each event.

In another embodiment, the panoramic camera is equipped with a thermal imaging array such that it can be used for infrared video. It will be appreciated that such infrared video could be used for example in surveillance or firefighting applications. Other applications will be readily apparent to those schooled in the relevant art.

In another embodiment, advertisers, merchandisers, and sponsors could associate metadata with unique assets in order to promote products, services, or ideas by either purchasing the rights to access the data repository (13) for one or more tags, or by having the remote user directed to the advertiser's web site. Using the hockey example from above, a remote user tracking their favorite player, could click on that player's visual indicator at which point a popup appears on the screen allowing them to purchase a jersey. A hyper link is shown in the popup which the user can then click through, redirecting them to the advertiser's web store to complete the transaction. Those skilled in the relevant art will appreciate that embodiments will apply equally to other sports but these are not meant to be limiting examples of embodiments.

For instance, in another embodiment, retail loyalty or advantage card information is associated and synchronized with metadata. In a non-limiting example, in a retail setting, a user's shopping card can be tracked by placing a RF tag on the card. The history of that shopper's store experience can then be stored during the checkout procedure, building a statistical profile of the shopper's habits.

Consider the following additional examples which are not intended to limit the scope of this disclosure but merely to illustrate additional contemplated embodiments.

In one non-limiting example, law enforcement agencies and first responders can equip their vehicles with Wi-Fi/UWB receivers, a panoramic streaming video camera mounted to the roof, and RF transmitters worn by personnel. Each vehicle would also be equipped with a 3G/4G/GPRS transmitter allowing remotely captured data and video streams to be transmitted via the cellular network. When arriving at a location, an ad hoc network is created that allows remote supervisory command and control. The panorama as captured by the roof-mounted video camera displays the location of the officer/agent's personal RF tag, as well as other statistics such as distance from the car, body temperature, heart rate, and other useful telemetry. This can be viewed remotely in real time, by multiple operators, each viewing a different portion of the panorama. Integrating public data, such as from Google Earth/Maps, as well as using multiple vehicles serves to increase the remote situational awareness.

In another non-limiting example, oil & gas drilling operations often run 24/7. Many personnel are required on site. Using this technology, the location of all personnel in real-time can be monitored, visually as well as spatially. Telemetry data such as pressure, temperature, flow rates, and the like can be aggregated and attached to the video stream. Infrared lighting may be used in conjunction with the panoramic camera to provide night vision.

In one more non-limiting example, sports teams can employ the technology for use in team and player analytics. Sports networks can employ the technology for marketing. For example, players on a hockey team may be equipped with RF transceivers. On-line game viewers can watch the game through one or more panoramic cameras while tracking their favorite players in real-time on the video stream. Moving a mouse over the player's tracking indicator will cause metadata to be displayed, such as player statistics, or opportunities to buy a jersey with the player's number.

While the various example embodiments have been described in connection with the examples provided herein, these were provided as non-limiting examples. Accordingly, embodiments may be used in similar contexts with similar devices and methods.

It will also be understood that the various embodiments may be implemented in one or more information handling devices configured appropriately to execute program instructions consistent with the functionality of the embodiments as described herein. In this regard, FIG. 1 illustrates a non-limiting example of such a device and components thereof.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the functions/acts specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A system, comprising:

a panoramic video camera that produces fixed panoramic video data of an area;

a plurality of radio frequency tags producing tracking data; and at least one of the plurality of radio frequency tags co-located with the panoramic video camera and producing tracking data for the panoramic video camera;

at least another of the plurality of radio frequency tags co-located with at least one object within the area and producing tracking data for the at least one object, wherein the tracking data for the at least one object identifies a location of the at least one object within the area in relation to the location of the panoramic video camera identified based upon the tracking data for the panoramic video camera;

a computing device, wherein the computing device receives the fixed panoramic video data and further receives the tracking data from the plurality of radio frequency tags;

the computing device generating a video stream by augmenting the fixed panoramic video data with the tracking data of the at least one object, wherein the augmented panoramic video allows following of the at least one object within the area using the tracking data, by at least one remote system;

the computing device sending the video stream to the at least one remote system;

the computing device receiving, from the at least one remote system, instructions selecting an object within the video stream section to be followed; and the computing device adjusting, based upon the received instructions, a view being viewed at the at least one remote system, wherein the adjusting comprises modifying a view within the video stream to follow the selected object, wherein the modifying comprises displaying a portion of the video stream by centering the selected object within the view of the video stream as the object moves through the area using the tracking data associated with the selected object.

2. The system of claim 1, wherein the tracking data for the panoramic video camera comprises position data for the panoramic video camera.

3. The system of claim 1, wherein the tracking data for the at least one object comprises a position of the at least object relative to the panoramic video camera.

4. The system of claim 1, wherein the video stream comprises a displayable portion of the fixed panoramic video data.

5. The system of claim 4, wherein the computing device receives adjustment information from the at least one remote system, wherein the adjustment information identifies a displayable portion within the panoramic video data to be viewed.

6. The system of claim 5, wherein the computing device generates an augmented video stream for the at least one remote device, wherein the augmented video stream comprises the identified displayable portion within the fixed panoramic video data.

7. The system of claim 1, wherein the computing device generates an augmented video stream for the at least one remote system, wherein the augmented video stream comprises a video stream that follows the object within the area.

8. The system of claim 1, wherein the computing device receives the fixed panoramic video data, receives the tracking data, generates the video stream, and sends the video stream in real-time.

9. The system of claim 1, wherein the video stream allows a user of the at least one remote system to adjust the video stream to track a particular object within the area based on the tracking data included in the video stream.

10. A device, comprising:

a remote computing device, comprising:

a processor; and a memory device that stores instructions executable by the processor to:

receive fixed panoramic video data of an area produced by a panoramic video camera;

receive tracking data produced by a plurality of radio frequency tags co-located with objects within the area, wherein the tracking data for each of the objects identifies a location of the object within the area in relation to the location of the panoramic video camera identified based upon tracking data for the panoramic video camera;

generate a video stream by augmenting the fixed panoramic video data with the tracking data;

stream a displayable portion of the video stream to at least one remote system;

receive, from the at least one remote system, selection information, wherein the selection information selects at least one of the objects within the area to follow and wherein the selection information comprises instructions to modify the displayable portion of the video stream based upon the selection information; and adjust the displayable portion of the video stream viewed at the remote system based upon the selection information, wherein to adjust comprises iteratively adjusting the displayable portion of the video stream to follow the selected at least one of the objects as the selected object moves through the area by centering the selected objected within the displayable portion of the video stream as the object moves through the area using the tracking data associated with the selected object.

11. The device of claim 10, wherein the video stream allows a user to adjust the displayable portion of the video stream.

12. The device of claim 10, wherein the selection information comprises information indicating an adjustment to the displayable portion of the video stream, wherein the adjustment indicates a new portion of the video stream to display.

13. The device of claim 10, wherein the instructions to receive fixed panoramic video data, receive tracking data, generate a video stream, and stream a displayable portion are conducted in real-time.

14. The device of claim 10, wherein the instructions to adjust the displayable portion is conducted during real-time receipt of the panoramic video data.

15. A system, comprising:

more than one panoramic video camera, each producing fixed panoramic video data of an area;

a plurality of radio frequency tags producing tracking data; and at least one of the plurality of radio frequency tags co-located with each of the more than one panoramic video camera and producing tracking data for each of more than one the panoramic video camera;

at least another of the plurality of radio frequency tags co-located with at least one object within the area and producing tracking data for the at least one object;

a computing device, wherein the computing device receives the panoramic video data from each of the more than one panoramic video camera and further receives the tracking data from the plurality of radio frequency tags;

the computing device generating a video stream by augmenting the fixed panoramic video data received from at least one of the more than one panoramic video camera with the tracking data, wherein the augmented panoramic video allows following of the at least one object within the area using the tracking data, by at least one remote system;

the computing device sending the video stream to the at least one remote system;

the computing device receiving, from the at least one remote system, instructions selecting an object within the video stream to be followed; and the computing device adjusting, based upon the received instructions, a view being viewed at the at least one remote system, wherein the adjusting comprises modifying a view within the video stream to follow the selected object, wherein the modifying comprises displaying a portion of the video stream by centering the selected object within the view of the video stream as the object moves through the area using the tracking data associated with the selected object.

16. The system of claim 15, wherein the panoramic video data that is augmented is selected based upon the location of the object with respect to the more than one panoramic video camera.

17. The system of claim 16, wherein the panoramic video data that is augmented is the panoramic video data received from the panoramic video camera being closest to the object.

* * * * *